United States Patent [19]

Barrera

[11] 3,956,928

[45] May 18, 1976

[54] VORTEX SHEDDING DEVICE FOR USE IN MEASURING AIR FLOW RATE INTO AN INTERNAL COMBUSTION ENGINE

[75] Inventor: Carlos M. Barrera, Detroit, Mich.

[73] Assignee: Ford Motor Company, Dearborn, Mich.

[22] Filed: Apr. 28, 1975

[21] Appl. No.: 572,605

[52] U.S. Cl............................... 73/116; 73/194 VS; 123/32 EA
[51] Int. Cl.².................... G01M 15/00; G01F 1/32
[58] Field of Search................ 73/194 VS, 204, 116, 73/118; 123/32 EA

[56] References Cited
UNITED STATES PATENTS

| | | | |
|---|---|---|---|
| 1,935,445 | 11/1933 | Heinz.................................. | 73/194 |
| 2,933,922 | 4/1960 | Davis............................. | 73/194 X |
| 3,116,639 | 1/1964 | Bird................................... | 73/194 |
| 3,199,348 | 8/1965 | Salera................................ | 73/204 |
| 3,204,458 | 9/1965 | Gillen................................ | 73/194 |
| 3,698,245 | 10/1972 | McNabb............................. | 73/194 |
| 3,818,877 | 6/1974 | Barrera et al..................... | 73/204 X |
| 3,874,234 | 4/1975 | Burgess.............................. | 73/194 |

*Primary Examiner*—Herbert Goldstein
*Attorney, Agent, or Firm*—Robert W. Brown; Keith L. Zerschling

[57] ABSTRACT

A vortex shedding device for use in measuring air flow rate into an internal combustion engine includes a conduit having a passage within it that includes a venturi section preferably of rectangular cross-section throughout. The conduit has four walls defining the venturi section and passage, and at least one of the walls has a recess formed in it. An elongated element for generating vortices in air flowing in the passage extends transverse to the direction of air flow through the throat portion of the venturi section. Circuit means are provided for determining the frequency at which vortices are generated, and such circuit means are located in the recess formed in the one wall of the conduit. A cover encloses the recess and circuit means within. The cover includes means for establishing a thermal barrier between the circuit means and the medium in which the vortex shedding device is immersed, typically this medium being the air within the engine compartment of a motor vehicle.

9 Claims, 3 Drawing Figures

VORTEX SHEDDING DEVICE FOR USE IN MEASURING AIR FLOW RATE INTO AN INTERNAL COMBUSTION ENGINE

BACKGROUND

This invention relates to a vortex shedding device for use in measuring the rate at which air flows into the air intake of an internal combustion engine. The subject matter of this patent application is related to that of similarly entitled commonly assigned and concurrently filed U.S. Application Ser. No. 572,606 filed Apr. 28, 1975 in the name of Gary L. Innes.

Of the prior art references known by the inventor, U.S. Pat. No. 3,722,275 to Rodely et al and U.S. Pat. No. 3,818,877 to Barrera et al are believed to be the most pertinent to the present invention; the disclosure of the Barrera et al patent 3,818,877 is incorporated herein by reference. Other patents of interest include U.S. Pat. No. 3,756,078 to Yamasaki et al; U.S. Pat. No. 3,863,500 to Yamasaki et al; and U.S. Pat. No. 3,854,334 to Herzl.

The vortex shedding device of the invention is primarily intended for use in the engine compartment of a motor vehicle for the purpose of measuring the amount of air entering the air intake of the internal combustion engine located therein. The vortex shedding device utilizes electronic circuit means to determine the frequency or rate at which vortices are generated in air flowing past an elongated vortex generating element. Preferably, this circuit means includes means for measuring the temperature and pressure of the air entering the engine intake through the vortex shedding device. Such measurements of temperature and pressure are necessary for conversion of air flow velocity or volumetric flow rate to a mass flow rate as described in the aforementioned U.S. Pat. No. 3,818,877 to Barrera et al. The engine compartment of a motor vehicle is a very hostile environment for circuit means of the kind described, due to the high and wide range of temperatures encountered, presence of electromagnetic interference and corrosive atmosphere, etc.

SUMMARY OF THE INVENTION

The present invention provides a compact vortex shedding device which may include, with the possible exception of a power supply, all of the elements and circuitry required to provide an electrical output signal indicative of the volumetric or mass flow rate of air into an internal combustion engine. The circuitry within the vortex shedding device may be insulated from the medium in which it is immersed, such as the hostile environment of the atmosphere in the engine compartment of a motor vehicle. Moreover, the circuit means of the vortex shedding device is located in proximity to the point at which vortices indicative of air flow rate are generated.

In accordance with the invention, a vortex shedding device for use in measuring the rate at which air flows into the air intake of an internal combustion engine comprises a conduit having a passage within it through which air whose flow rate is to be measured may flow. This passage has a venturi section formed in it, preferably of rectangular cross-section throughout, which includes an inlet portion, a throat portion smaller in cross-sectional area than the cross sectional area of the inlet portion, a converging portion between the inlet and throat portions, and a diverging portion extending away from the throat portion toward the end of the passage remote from the inlet portion. The conduit has four walls defining the venturi section, and at least one of the walls has a recess, or, niche, formed in it, the recess being located between two other of the conduit walls. An elongated element for generating vortices in air flowing in the passage is located in the throat portion of the venturi section and extends transverse to the direction of air flow. Circuit means for use in determining the frequency or rate at which vortices are generated in air flowing past the elongated element are mounted within the recess in the one wall. A cover encloses the recess and circuit means within it, the cover including means for establishing a thermal barrier between the circuit means within the recess and the medium in which the vortex shedding device is immersed. Means may be provided for shielding the circit means from electromagnetic radiation.

The invention may be better understood by reference to the detailed description which follows and to the drawings.

BRIEF DESCRIPTION OF THE DRAWINGS

FIG. 3 is an elevational view, partially in section, of the vortex shedding device of FIGS. 1 and 2.

DETAILED DESCRIPTION

Figure 1:
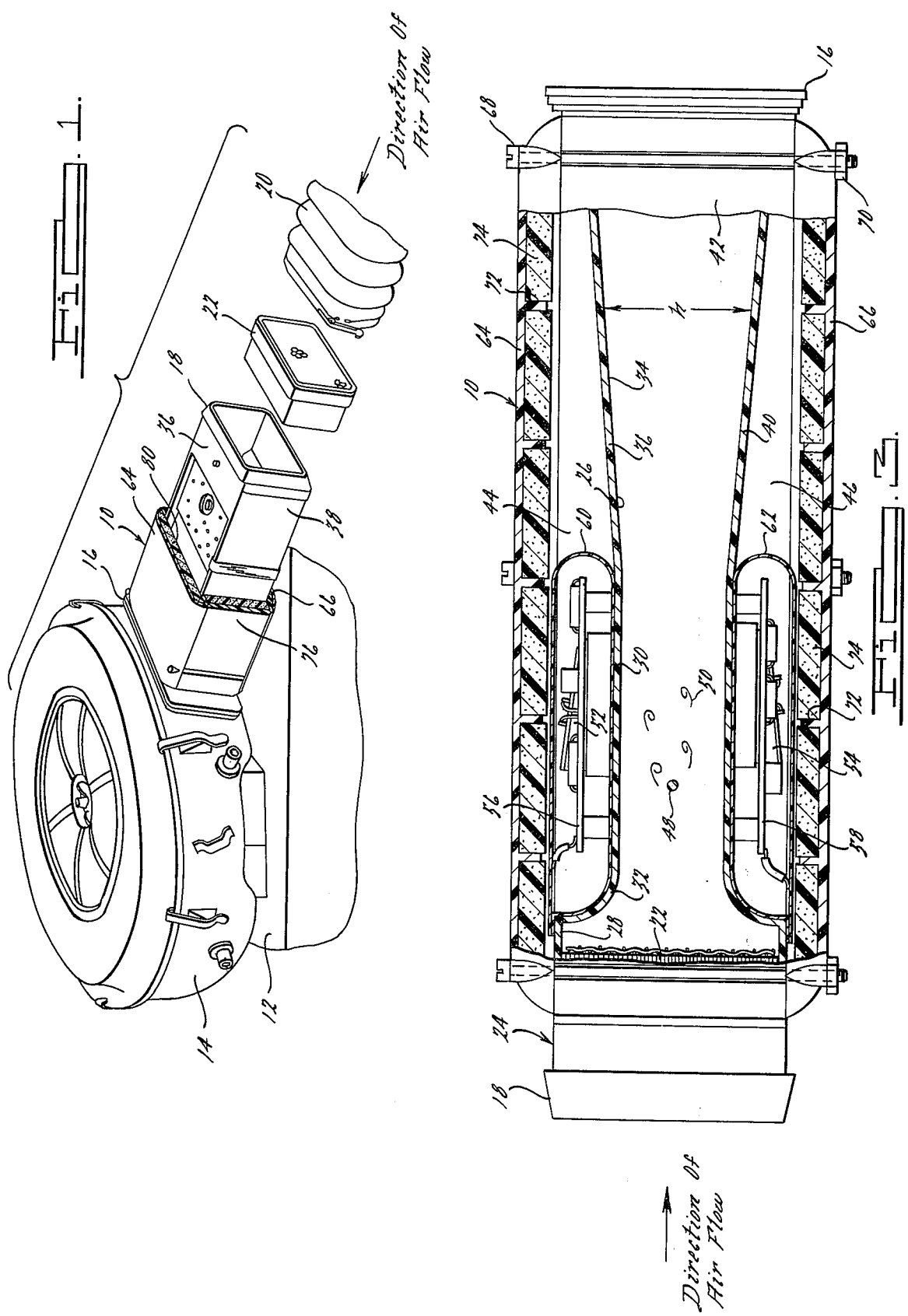
FIG. 1 is a perspective view, partially in section and exploded, of a vortex shedding device according to the invention attached to a conventional air cleaner surrounding the air intake of an internal combustion engine.
Figure 2:
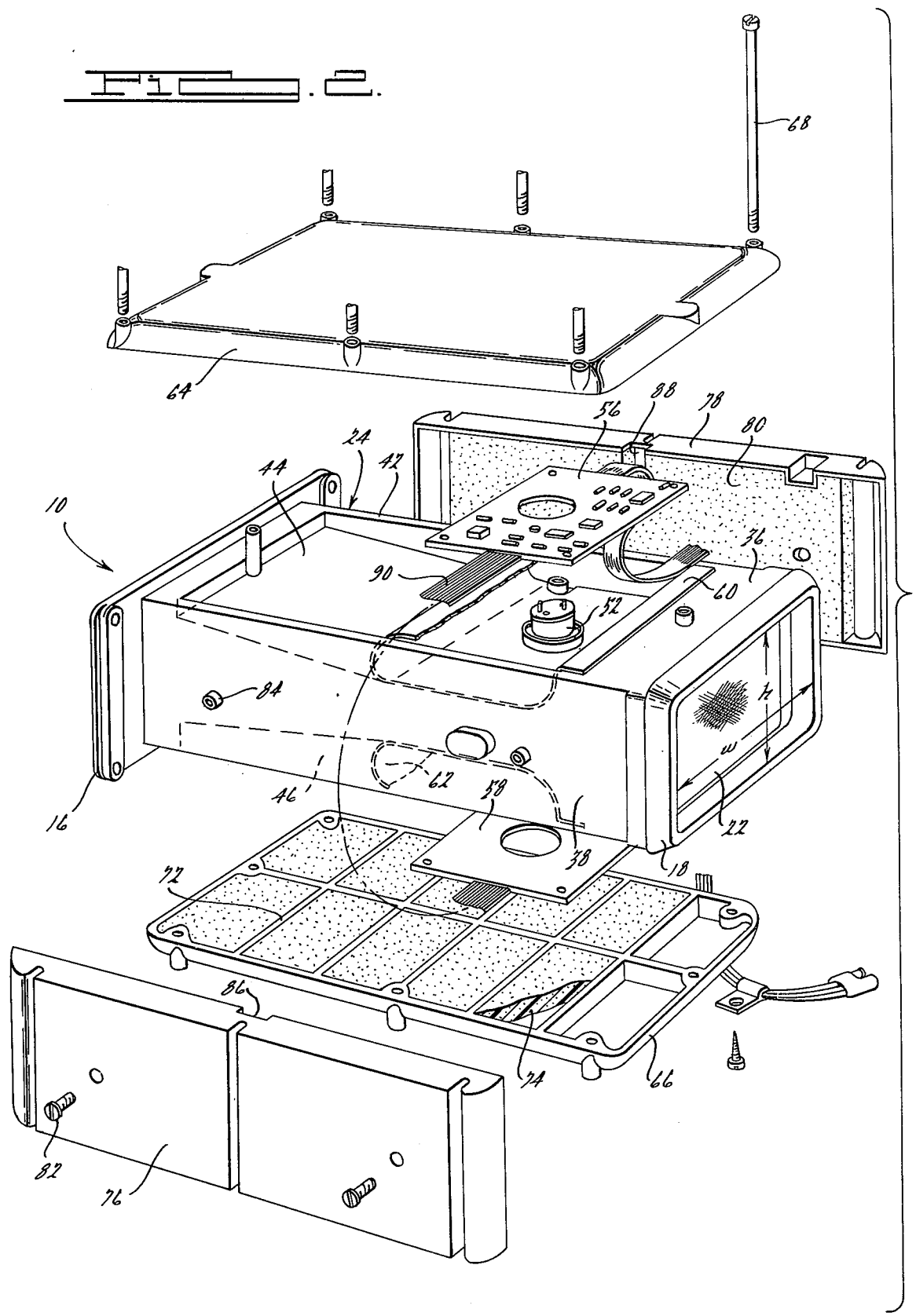
FIG. 2 is an exploded perspective view of the vortex shedding device shown in FIG. 1.

With reference now to the drawings, wherein like numerals refer to like parts in the several views, there is shown a vortex shedding device 10 for use in measuring the rate at which air flows into the air intake of an internal combustion engine 12. The air intake of the engine includes a conventional air cleaner 14 to which the vortex shedding device 10 is attached at its discharge end 16. Air may enter the engine 12 and air cleaner 14 through the vortex shedding device 10. Air may be supplied to the inlet end 18 of the device 10 through a flexible conduit 20. A honeycomb structure, with or without a screen 22, may be located within the inlet portion of the vortex shedding device to aid in eliminating air velocities other than in the general direction of air flow and to produce turbulence on a smaller scale than would otherwise occur.

The vortex shedding device 10 includes a conduit, generally designated by the numeral 24, having a passage 26 within it, the passage 26 including a venturi section having an inlet portion 28, a throat portion 30 smaller in cross-sectional area than the cross-sectional area of the inlet portion, a converging portion 32 between the inlet and throat portions, and a diverging portion 34 extending away from the throat portion toward the end of the passage remote from the inlet portion. The venturi section preferable is of rectangular cross-section throughout. The conduit has walls 36, 38, 40 and 42. Adjacent walls are perpendicular to one another and the opposite walls 38 and 42 are parallel. Preferably, the walls are of substantially uniform thickness over the length of the venturi section as illustrated. In the drawings, the dimensions of the rectangular venturi section are designated as the width $w$ and height $h$. As illustrated the width $w$ is the greater of these dimen-

3 sions and is constant throughout the length of the venturi section. The venturi-section converging portion 32 and diverging portion 34 are achieved by variation of the height dimension h.

As a result of the variation of the height dimension h of the passage 26 in conduit 24, there are formed recesses, or, niches, 44 and 46 in the opposite walls 36 and 40, respectively, of the conduit 24.

An elongated element 48, such as a metal rod, is mounted within the throat portion 30 of the venturi section or passage 26 and extends transverse to the indicated direction of air flow and parallel to the width dimension w of the passage. As air flows through the passage 26, vortices 50 are generated by the elongated element 48. The frequency or rate at which these vortices are formed is proportional to the air velocity and provides an indication of volumetric flow rate. A sonic transmitter 52, such as a piezoelectric crystal, is positioned within the recess 44 and mounted on the conduit 24 to transmit sound waves through the air within the passage 26 in a direction substantially perpendicular to the direction of air flow. A sonic receiver 54, which may also be a piezoelectric crystal, receives the transmitted sonic waves, which are modulated by the presence of the vortices 50. In the recess 44, a printed circuit board 56 has a central opening in it through which the sonic transmitter 52 extends so that circuit elements in the printed circuit board may be located in proximity to the transmitter. Similarly, a circuit board 58 surrounds the receiver 54 and may include circuit means associated with the receiver 54 for receiving and demodulating sonic waves transmitted by the transmitter 52, thereby, to produce an electrical output signal from the vortex shedding device 10 indicative of the rate at which air flows into the air intake of the internal combustion engine 12. Thus, the circuit means 56 and 58 separately and together constitute circuit means for use in determining the frequency or rate at which vortices are generated in air flowing past the elongated element 48 located in the throat portion of the passage 26. Detailed circuitry which may be utilized to perform the functions specified for circuit means 56 and 58 is illustrated in the aforementioned U.S. Pat. No. 3,818,877 to Barrera et al. Of course, other circuit means known to those skilled in the art, such as thermal sensing or the like, for use in determining the rate at which vortices 50 are formed, may be utilized and located in one or both of the recesses 44 and 46.

Means may be provided for shielding the circuit means 56 and 58 and the transducers 52 and 54 from electromagnetic radiation such as may be generated by the ignition system of the internal combustion engine 12. For this purpose, the circuit means 56 and transmitter 52 is covered by a plastic laminant 60 which has a conductive sheet imbedded in it. Similarly, a laminant 62 covers the circuit means 58 and receiver 54. Alternatively, all or the exterior portions of the vortex shedding meter 10 may be made from metal or, if made from a nonconductive material such as plastic, its exterior portions may be metalized.

The recesses 44 and 46 are enclosed, respectively, by covers 64 and 66 secured to the conduit 24 with bolts 68 and nuts 70. The covers 64 and 66 both have inernal reinforcement ribs 72 that divide the covers into sections filled with thermal insulation 74, which may be urethane foam or the like. Thus, the covers 64 and 66, respectively, provide thermal barriers for the circuit means 56 and 58 within the recesses 44 and 46 to insulate these circuit means from the medium in which the vortex shedding device 10 is immersed. Since the circuit means may include sensors of temperature and pressure of he air within the passge 26 of the device 10, the thermal barriers arc of increased importance.

Preferably, the walls 38 and 42, respectively, have covers 76 and 78 attached to them. These covers also may contain a urethane foam or other thermal barrier material 80 to isolate these walls from the medium in which the vortex shedding device 10 is immersed. Screws 82 are utilized to attach the covers 76 and 78 to bosses 84 molded into the walls 38 and 42. Also, the covers 76 and 78 include channels 86 and 88, respectively, extending between the enclosed recesses 44 and 46 to permit one or more electrical conductors 90 to interconnect the circuitry on circuit boards 56 and 58, such conductors being located in the channels 86 or 88 and thus being enclosed and protected from damage.

Based upon the foregoing description of the invention, what is claimed is:

1. A vortex shedding device for use in measuring the rate at which air flows into the air intake of an internal combustion engine, said device comprising:

a conduit having a passage within it through which air whose flow rate is to be measured may flow, said passage having a venturi section formed in it, said venturi section being of rectangular cross-section throughout and having width and height dimensions, said venturi section including an inlet portion, a throat portion smaller in cross-sectional area than the cross-sectional area of said inlet portion, a converging portion between said inlet and throat portions, and a diverging portion extending away from said throat portion toward the end of said passage remote from said inlet portion, said converging and diverging portions of said venturi section being formed by the variation of at least said height dimension, said conduit having four walls defining said venturi section of said passage, at least one of said walls having a recess formed in it, said recess being located between two other of said walls;

an elongated element for generating vortices in air flowing in said passage in a direction from said inlet portion toward said diverging portion, said elongated element being located in said throat portion of said passage and extending transverse to said direction of air flow;

circuit means for use in determining the frequency or rate at which vortices are generated in air flowing past said elongated element, said circuit means being mounted within said recess in said one wall of said conduit; and a cover enclosing said recess and said circuit means within said recess, said cover including means for establishing a thermal barrier between said circuit means within said recess and the medium in which said vortex shedding device is immersed.

2. A vortex shedding device according to claim 1 wherein said one wall is a wall of said conduit parallel to said width dimension of said venturi section of said passage.

3. A vortex shedding device according to claim 1 wherein said conduit includes a second wall of said four walls, said second wall having a second recess formed in it, said second recess also being located between said two other of said walls; and wherein said vortex shedding device further includes second circuit means for use, in association with said first-mentioned circuit means, in determining the frequency or rate at which vortices are generated in air flowing past said elongated element, said second circuit means being mounted within said second recess in said second wall of said conduit, and a second cover enclosing said second recess, said second cover including means for establishing a thermal barrier between said second circuit means within said second recess and said medium in which said vortex shedding device is immersed.

4. A vortex shedding device according to claim 2 wherein said elongated element also extends parallel to said width dimension.

5. A vortex shedding device according to claim 2 wherein said one wall of said conduit is of substantially uniform thickness over the length of said venturi section, said recess resulting from said variation of said height dimension of said venturi section.

6. A vortex shedding device according to claim 3 wherein said one wall and said second wall are of substantially uniform thickness over the length of said venturi section, said first-mentioned recess and said second recess resulting from said variation of said height dimension of said venturi section.

7. A vortex shedding device according to claim 6 which further includes means for establishing a thermal barrier between at least one of said two other of said walls and said medium in which said vortex shedding device is immersed.

8. A vortex shedding device according to claim 7 which further includes conductor means for electrically interconnecting said first-mentioned circuit means and said second circuit means, said means for establishing a thermal barrier between said at least one of said two other walls and said medium including a channel extending between said enclosed first-mentioned and second recesses, said conductor means being located in said channel.

9. A vortex shedding device according to claim 1 which further includes conductive means, covering said circuit means, for shielding said circuit means from electromagnetic radiation generated in the medium in which said vortex shedding device is immersed.

* * * * *